United States Patent [19]

Sid-Ahmed et al.

[11] 3,853,821
[45] Dec. 10, 1974

[54] SOLID STATE POLYMERIZATION OF POLYESTERS IN THE PRESENCE OF A DIISOCYANATE

[75] Inventors: Abdel-Hadi Sid-Ahmed, Akron; William C. Tung, Tallmadge, both of Ohio

[73] Assignee: The Goodyear Tire & Rubber Company, Akron, Ohio

[22] Filed: May 1, 1974

[21] Appl. No.: 465,984

[52] U.S. Cl. ............... 260/75 NE, 260/77.5 SS
[51] Int. Cl. ............... C08g 22/10, C08g 22/26
[58] Field of Search ............... 260/75 NE, 77.5 SS

[56] References Cited
UNITED STATES PATENTS 3,563,849  2/1971  Rye et al. ............... 260/77.5 SS
3,580,886  5/1971  Stewart et al. ............... 260/77.5 SS
3,645,933  2/1972  Flint ............... 260/77.5 SS Primary Examiner—H. S. Cockeram
Attorney, Agent, or Firm—F. W. Brunner; J. P. Ward

[57] ABSTRACT

There is disclosed an improvement in the solid state polymerization of melt polymerized polyester resin to produce polyester resins having intrinsic viscosities of at least 1.0 as determined in a 60/40 phenol/tetrachloroethane mixed solvent at 30°C. comprising adding to said melt polymerized polyester resin, prior to the solid state polymerization thereof, from 0.1 to 2.0 percent by weight of an organic aromatic diisocyanate which diisocyanate material provides for increased solid state polymerization rates.

5 Claims, No Drawings

SOLID STATE POLYMERIZATION OF POLYESTERS IN THE PRESENCE OF A DIISOCYANATE

This invention relates to the polymerization of linear polyester resins in the solid state. More particularly this invention relates to an improvement in the solid state polymerization whereby the polymerization can be carried out at accelerated rates.

In solid state polymerization processes designed to produce polyester resins having intrinsic viscosities of at least 1.0, polyester resin, prepared by esterification or transesterification of a dicarboxylic acid or $C_1$ to $C_4$ alkyl ester thereof with a glycol and subsequent melt polymerization, is first reduced to a finely divided state and then heated in solid form under conditions which promote further condensation and allow for the removal of gaseous by-products. Generally these conditions involve heating the polyester resin in a suitable apparatus in a stream of an inert gas such as nitrogen or under conditions of high vacuum. However, the temperatures that can be used for the solid state polymerization are limited by the sticking temperature and the melting point of the polyester resin. For example, in the solid state polymerization of poly(ethylene terephthalate), the highest temperatures which can be employed range from 240° to 245° C., which temperatures are just below the sticking temperature of this polyester and about 20° C. below its melting temperature. As a result the polymerization rate of poly(ethylene terephthalate) is slow, requiring several hours of treatment to achieve high molecular weight product, i.e., product having an intrinsic viscosity of 1.0 or higher.

A means has now been found for accelerating the polymerization rate during the solid state polymerization of melt polymerized polyester resin, thus providing for significantly shorter than normal process times. According to the present invention accelerated solid state polymerization rates can be achieved, in the production of polyester resin having an intrinsic viscosity of at least 1.0, by incorporating in the melt polymerized polyester resin, prior to carrying out the solid state polymerization thereof, from 0.1 to 2.0 percent by weight of an organic aromatic diisocyanate corresponding to the formula O=C=N—R—N=C=O where R is a divalent aromatic radical selected from the group consisting of radicals of the formulae

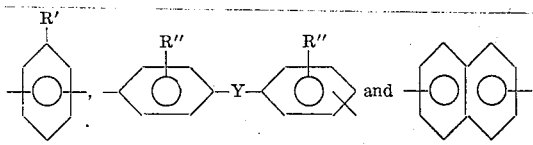

where R' is selected from the group consisting of hydrogen atom and alkyl radicals containing from 1 to 10 carbon atoms, R" is selected from the group consisting of hydrogen atom, alkyl radicals containing from 1 to 10 carbon atoms and alkoxy radicals containing from 1 to 10 carbon atoms and Y is a direct bond or methylene radical, based on the weight of the melt polymerized polyester resin.

In the practice of the present invention any of the well known and commercially available organic aromatic diisocyanates, corresponding to the above formulae can be employed to accelerate the solid state polymerization rate. Representative examples of such organic aromatic diisocyanates include diphenylmethane-4,4'-diisocyanate, toluene-2,4-diisocyanate, toluene-2,6-diisocyanate, bitolylene diisocyanate (diphenyl-3,3'-dimethyl-4,4'-diisocyanate), dianisidine diisocyanate (diphenyl-3,3'-dimethoxy-4,4'-diisocyanate), metaphenylene diisocyanate, paraphenylene diisocyanate, 4,4'-diphenyl diisocyanate, 1,5-naphthylene diisocyanate and the like. Especially useful organic aromatic diisocyanates include dianisidine diisocyanate, bitolylene diisocyanate and diphenylmethane-4,4'-diisocyanate as exemplified in the illustrative examples herein.

As disclosed hereinabove, the organic aromatic diisocyanates useful in this invention are added to the melt polymerized polyester resins in amounts ranging from 0.1 to 2.0 percent by weight based on the weight of said polyester resins and at a point in time prior to carrying out the solid state polymerization thereof. In general the aromatic diisocyanate is incorporated into the melt polymerized polyester resin at the beginning, during or after completion of the polycondensation stage of either the esterification-polycondensation or transesterification-polycondensation polyester forming processes described above. It is most convenient, however, to incorporate the aromatic diisocyanate into the melt polymerized polyester resin at the beginning of the polycondensation stage of the polyester forming process.

The term "melt polymerized polyester resin" as used throughout this specification means linear polyesters and copolyesters prepared by any of the well known polyester forming processes known in the art wherein melt polymerization constitutes one stage in the process. Thus the melt polymerized polyester resins to which the present invention is applicable include those linear polyester and copolyester resins prepared by either the direct esterification-polycondensation process wherein a dicarboxylic acid and a diol of the series $HO(CH_2)_nOH$, where n is an integer ranging from 2 to 10, are first reacted together to form a diglycol ester which is then polycondensed under melt conditions to high molecular weight product or the transesterification-polycondensation process wherein a $C_1$ to $C_4$ alkyl ester of a dicarboxylic acid and a glycol such as defined above are first reacted together to form a diglycol ester which is then subjected to melt polycondensation conditions to form high molecular weight product. The reaction conditions of temperature, pressure, catalyst, etc. involved in carrying out the esterification or transesterification and polycondensation stages in these processes are all well known (see, for example, U.S. Pat. No. 3,756,866).

Representative examples of dicarboxylic acids and $C_1$ to $C_4$ lower alkyl esters thereof which can be advantageously employed in these processes include terephthalic acid, isophthalic acid, diphenyl-p,p'-dicarboxylic acid, naphthalene dicarboxylic acids and the like and the dimethyl, diethyl, dipropyl and dibutyl esters thereof. Useful glycols corresponding to the above formula include ethylene glycol, propylene glycol, tetramethylene glycol, neopentyl glycol, hexamethylene glycol, decamethylene glycol and the like. Also, glycols such as 1,4-dimethanol cyclohexane have been found to be useful.

The present invention is also applicable to polyesters prepared from various combinations of two or more of the above described acids, esters and glycols. The preferred melt polymerized polyesters to which the present invention is applicable, however, are those in which at least 80 percent of the acid component consists of units of terephthalic acid and at least 80 percent of the glycol component consists of units of ethylene glycol.

Five samples of melt polymerized poly(ethylene terephthalate) resin were prepared for subsequent use in Examples 1 – 5 hereinbelow. The five samples were prepared by a transesterification-polycondensation process employing three-neck glass reaction tubes approximately 15 inches long and 1.75 inches in diameter. In each instance 70 grams of dimethyl terephthalate and 45 milliliters of ethylene glycol were added to the glass reaction tube which was submerged in a dimethyl phthalate constant temperature bath. The reaction mixture was heated to 160°–165°C. under a nitrogen purge, after which 0.0236 gram of manganese acetate was added. The reaction temperature was then increased to 225°C. and the reaction allowed to proceed, with constant agitation, until 29 milliliters of methanol by-product were collected. At this time 0.7 milliliter of a triphenyl phosphite solution was added to the reaction tube. The triphenyl phosphite solution was prepared by diluting four grams of triphenyl phosphite with toluene to a total volume of 100 milliliters. The reaction mixture was stirred for five minutes, after which 0.0176 gram of antimony trioxide was added. The reaction temperature was gradually increased to 270° C. and the pressure reduced. In four of the poly(ethylene terephthalate) preparations, after 21 milliliters of by-product ethylene glycol were collected, the vacuum was released under a nitrogen purge and a quantity of an organic aromatic diisocyanate added to the reaction tube. Full vacuum (less than 0.1 millimeter of mercury pressure) was then applied to the reaction tube and the temperature of reaction increased to 280° C. The polycondensation was continued under these conditions for a period of 2 hours, after which the polyester product was removed from the reaction tube, cooled and ground to particles capable of passing a 40 mesh screen. In the single preparation where no diisocyanate was added the polycondensation, after addition of the antimony trioxide, was carried out in its entirety at 280° C. under full vacuum without interruption.

The invention is illustrated below employing the poly(ethylene terephthalate) samples prepared in accordance with the above described procedure. All parts and percentages are by weight unless otherwise indicated. The term "I.V." as employed throughout the examples represents the intrinsic viscosity of the polyester sample as determined in a 60/40 phenol-tetrachloroethane mixed solvent at 30° C. The term "COOH" represents the free carboxyl end group concentration of the polyester sample as determined by the method by Pohl in *Analytical Chemistry*, Vol. 26, page 1614 (1954) and is expressed in equivalents per million grams of polyester (eq./$10^6$ g.).

EXAMPLE 1 (Control)

Fifteen grams of the ground poly(ethylene terephthalate) prepared as described hereinabove and containing no diisocyanate were polymerized in a cylindrical glass reaction tube in the solid state employing fluidized bed techniques at a temperature of 245° C. The fluidizing media consisted of preheated nitrogen gas flowing through the tube and polyester at a rate of 6,600 cubic centimeters/minute. The table below contains all pertinent data on the solid state polymerization rate for this control experiment as evidenced by the increases in the intrinsic viscosity (I.V.) of the samples with time.

TABLE I

|      | Polymerization Time — Minutes |      |      |      |      |      |      |      |
|------|------|------|------|------|------|------|------|------|
|      | 0    | 15   | 30   | 45   | 60   | 75   | 90   | 105  |
| I.V. | 0.64 | 0.76 | 0.90 | 1.01 | 1.12 | 1.13 | 1.18 | 1.20 |
| COOH | 28   | 23   | —    | 17   | —    | 16   | —    | 17   |

EXAMPLES 2 –5

Fifteen grams of each of the four samples of poly(ethylene terephthalate) prepared as described hereinabove and containing various organic aromatic diisocyanate compounds were individually subjected to solid state polymerization in the same manner as described in Example 1. Periodic samples were taken during the course of the solid state polymerizations to determine the increases in I.V. and thus the rate of polymerization. All pertinent data are listed in the table below. In addition, the four samples, after completion of the solid state polymerizations, were found to contain 2 eq./$10^6$ g. or less of carboxyl end groups (COOH) as compared to 17 eq./$10^6$ g. of carboxyl end groups for the control sample (Example 1).

TABLE II

| Pzn. Time Min. | Sample No. | | | | | | | |
|---|---|---|---|---|---|---|---|---|
| | 2 (a) | | 3 (b) | | 4 (c) | | 5 (d) | |
| | I.V. | COOH | I.V. | COOH | I.V. | COOH | I.V. | COOH |
| 0   | 0.64 | 1.0 | 0.64 | 1.0 | 0.62 | 2.0 | 0.62 | 2.0 |
| 15  | 0.86 | —   | 0.88 | 1.0 | 0.88 | —   | 0.95 | —   |
| 18  | —    | —   | —    | —   | —    | —   | 1.0  | —   |
| 19  | —    | —   | 1.0  | —   | —    | —   | —    | —   |
| 24  | 1.00 | —   | —    | —   | —    | —   | —    | —   |
| 30  | 1.10 | 1.0 | 1.26 | 1.0 | 1.08 | 4.0 | 1.26 | —   |
| 45  | 1.29 | 1.0 | 1.42 | 1.0 | 1.25 | 3.0 | 1.55 | —   |
| 60  | 1.50 | —   | 1.51 | —   | 1.38 | 1.0 | 1.70 | —   |
| 75  | 1.56 | —   | 1.61 | 0   | 1.48 | 1.0 | 1.82 | 1.0 |
| 90  | 1.65 | 0   | 1.75 | —   | 1.60 | 1.0 | 1.91 | —   |
| 105 | 1.75 | —   | 1.73 | —   | 2.06 | 1.0 | 2.02 | 2.0 |

(a) Sample contained 0.5 weight percent of dianisidine diisocyanate
(b) Sample obtained 0.5 weight percent of bitolylene diisocyanate
(c) Sample contained 0.3 weight percent of diphenyl methane-4,4'-diisocyanate
(d) Sample contained 0.45 weight percent of diphenylmethane-4,4'-diisocyanate A comparison of the data in the above Table II with that in Table I (the control example) discloses that the addition of an organic aromatic diisocyanate greatly reduces the time required to obtain a high molecular weight polyester product, i.e., a product having an intrinsic viscosity of 1.0 or higher. In other words, the addition of organic aromatic diisocyanate greatly accelerates the polymerization rates for melt polymerized polyester resins subjected to solid state conditions.

While certain representative embodiments and details have been shown for the purpose of illustrating the invention it will be apparent to those skilled in this art that various changes and modifications may be made therein without departing from the spirit or scope of the invention.

What we claim is:

1. In a process for preparing polyester resin having an intrinsic viscosity of at least 1.0 by solid state polymerization of melt polymerized polyester resin prepared by esterification or transesterification of a dicarboxylic acid or $C_1$ to $C_4$ alkyl ester thereof with a glycol of the series $HO(CH_2)_nOH$ where n is an integer ranging from 2 to 10 and polymerization of the esterification or transesterification product, the improvement which comprises adding to said melt polymerized polyester resin prior to carrying out the solid state polymerization thereof from 0.1 to 2.0 percent by weight of an organic aromatic diisocyanate corresponding to the formula $O=C=N-R-N=C=O$ where R is a divalent aromatic radical selected from the group consisting of radicals of the formulae

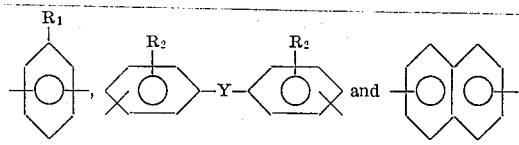

where $R_1$ is selected from the group consisting of hydrogen atom and alkyl radicals containing from 1 to 10 carbon atoms, $R_2$ is selected from the group consisting of hydrogen atom, alkyl radicals containing from 1 to 10 carbon atoms and alkoxy radicals containing from 1 to 10 carbon atoms and Y is selected from the group consisting of a direct bond and methylene radical, said percent by weight of the organic aromatic diisocyanate being based on the weight of the melt polymerized polyester resin.

2. The improvement of claim 1 wherein the melt polymerized polyester resin is poly(ethylene terephthalate).

3. The improvement of claim 1 wherein R of the organic aromatic diisocyanate is a radical of the formula

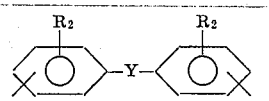

wherein $R_2$ is selected from the group consisting of hydrogen atom, alkyl radicals containing from 1 to 10 carbon atoms, and alkoxy radicals containing from 1 to 10 carbon atoms and Y is selected from the group consisting of a direct bond and methylene radical.

4. The improvement of claim 3 wherein the organic aromatic diisocyanate is selected from the group consisting of dianisidine diisocyanate, bitolylene diisocyanate and diphenylmethane-4,4'-diisocyanate.

5. The improvement of claim 1 wherein the organic aromatic diisocyanate is added to the melt polymerized polyester resin in the polymerization stage of the process for preparing said melt polymerized polyester.

* * * * *